Aug. 3, 1965  F. S. MACKLEM  3,199,018
ALTERNATING CURRENT LINE REGULATOR
Filed Jan. 24, 1963  2 Sheets-Sheet 1

INVENTOR
F. SUTHERLAND MACKLEM
BY
ATTORNEYS

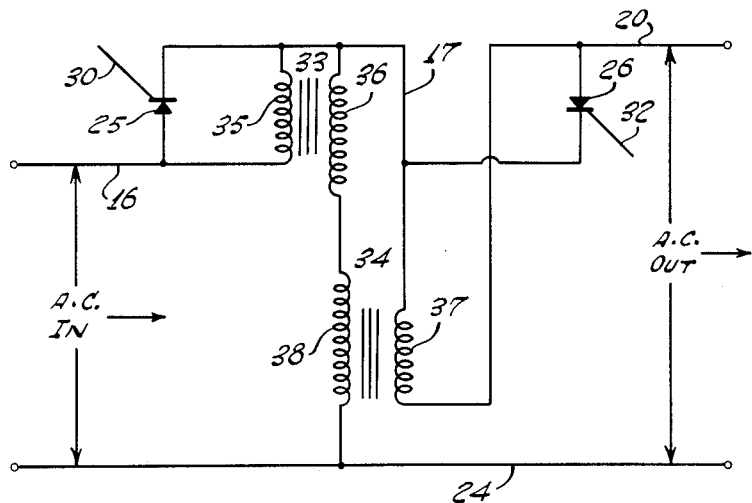
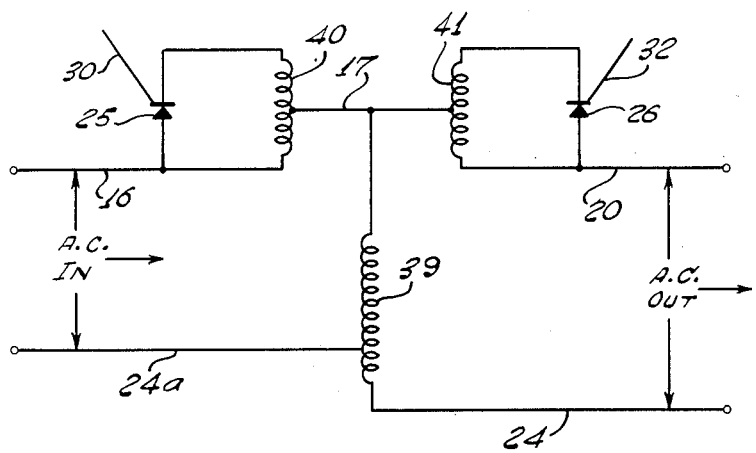

United States Patent Office 3,199,018
Patented Aug. 3, 1965

3,199,018
ALTERNATING CURRENT LINE REGULATOR
F. Sutherland Macklem, 291 S. Main St.,
New Canaan, Conn.
Filed Jan. 24, 1963, Ser. No. 253,575
13 Claims. (Cl. 323—45)

This invention relates in general to alternating current line regulators and more particularly to alternating current line regulators which utilize magnetic control circuits and solid state gating elements.

In keeping with present day technological advances, it is desired to reduce the weight and size of various electrical component parts while increasing, or at least maintaining, the operating characteristics and results of each part.

Accordingly, one object of this invention is to provide an alternating current line regulator which is adapted to control relatively large amounts of alternating current power with electrical components that are relatively small in size and weight.

Another object of this invention is to provide a new and improved circuit for regulating alternating current line voltage.

An additional object of this invention is to provide an alternating current regulator in which size and weight are minimized without degrading circuit performance or reliability.

A further object of this invention is to provide a regulating circuit which regulates alternating current line voltage regardless of the impedance level of a load coupled to the output of the circuit.

Still a further object of this invention is to provide a circuit for regulating the alternating line voltage of a step-up or step-down transformer.

In general terms, the A.C. line regulator of this invention comprises a core of magnetizable material which is arranged to provide a two loop magnetic circuit. A source of alternating current is coupled to both magnetic loop circuits via a primary winding, and two independent control windings are coupled magnetically with a respective one of the two core loops. Suitable gate means, such as silicon controlled rectifiers, are connected across each of the two control windings to selectively short one or the other of the control windings in response to amplitude variations in the alternating current source. The output of the regulator can be taken from a pair of output windings which are coupled to respective magnetic loop circuits, but in the preferred form of the invention the two control windings are connected to act as both control windings and output windings.

A complete understanding of the invention can be obtained from the following detailed description of an apparatus forming a specific embodiment thereof, when read in conjunction with the appended drawings, in which:

FIG. 3 is an equivalent circuit of a portion of a second embodiment of the regulator of the invention; and, FIG. 4 is an equivalent circuit of a portion of a third embodiment of the regulator of the invention.

Figure 1:
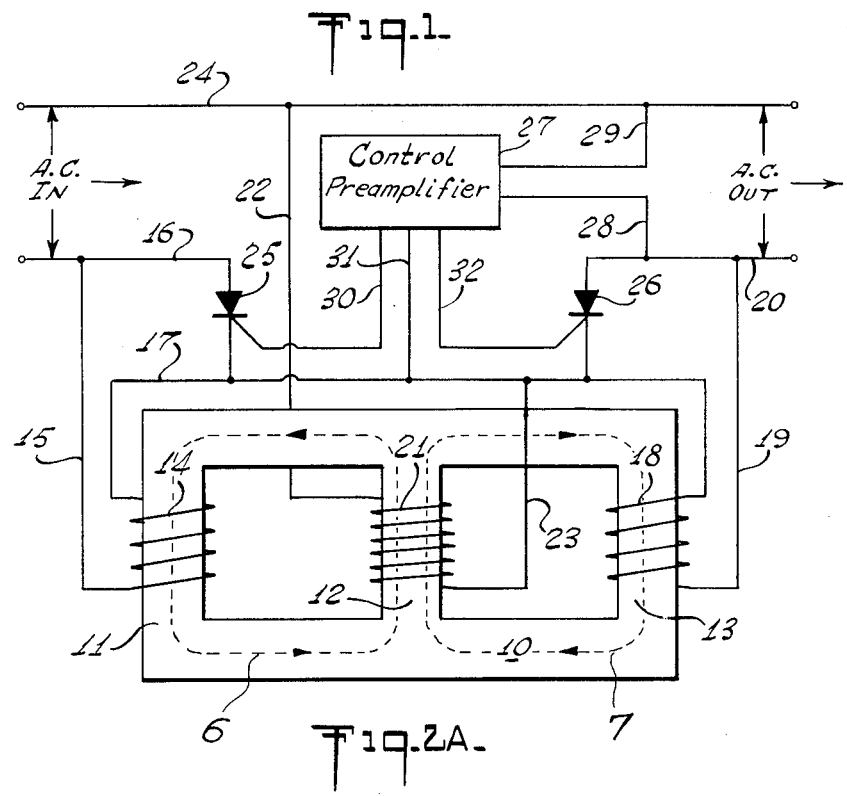
FIG. 1 is a schematic circuit diagram of one illustrative embodiment of this invention.

Referring now to a preferred form of the invention as shown in FIG. 1, a core 10 is formed of a suitable magnetizable material such as laminated transformer iron with three legs 11, 12 and 13, making two loops 6 and 7. Core loop 6 passes through a control winding 14 and core loop 7 passes through a control winding 18. Control winding 14 is thereby coupled magnetically with loop 6 and control winding 18 is coupled magnetically with loop 7. Both of the loops 6 and 7 formed by the core 10 pass through a primary winding 21 and thereby the primary winding 21 is coupled magnetically with both loop 6 and loop 7. The control windings 14 and 18 in this preferred form of the invention serve also as the output windings. Thus windings 14 and 18 are connected in series by a conductor 17. The other end of winding 14 is connected by a conductor 15 to one side 16 of an alternating current input line and the other end of winding 18 is connected by a conductor 19 to one side 20 of an alternating current output line. Windings 14 and 18 preferably contain the same number of turns and are connected in series opposition so that the algebraic sum of their voltages appear at A.C. output terminal 20. They can, however, be connected in series aiding if one winding has twice as many turns as the other, for reasons which will be explained later.

A primary winding 21 is coupled magnetically with the center leg 12 of the core 10, and conductor 22 connects the primary winding 21 to the alternating current line. The opposite end of the primary winding 21 is connected to the conductor 17 between the two control windings 14 and 18.

A suitable gating means 25, such as a silicon controlled rectifier element, is connected in parallel across the control winding 15, and a similar gating element 26 is connected across the control winding 18 so that the corresponding control winding can be shorted by closing either of these gating elements. With the connections as described above, that is, the primary winding 21 on the center core leg 12 connected to the alternating current line 24 and between the windings 14–18 to the conductor 17, magnetic lines of flux are set up which divide between the two magnetic loops 6 and 7 to induce voltages in the two control windings 14 and 18. Since the control windings are connected in series opposition, the difference between the control winding voltages is added to (or subtracted from) the alternating current line voltage.

A control preamplifier 27 has an input connected across the sides of 20–24 of the alternating current line by means of conductors 28 and 29, respectively. The principal purpose of the control preamplifier 27 is to detect either a rise or a fall in the voltage of the alternating current line and, by means of conductors 30–31 and 32, to fire one or the other of the gates 25 and 26. By the term "fire" is meant that a particular gate is rendered conductive.

When neither of the gates 25, 26 is fired, as when the line voltage is correct, the magnetic flux developed by the primary winding 21 divides equally betwen the outer core legs 11 and 13, and equal voltages are induced in the control windings 14 and 18 so that no effect is had on the line voltage. On the other hand, if the line voltage drops, the control preamplifier 27 fires one of the gates, for example, gate 26. The firing of the gate 26 shorts the control winding 18, and the magnetic flux normally in the core leg 13 now is switched to the other core leg 11.

Therefore, the voltage in the other control winding 14 is increased correspondingly and adds to the line voltage.

Assume now that the line voltage rises instead of drops, the control preamplifier 27 then fires the other gate 25 to short the control winding 14. Therefore, the voltage in the winding 18 is increased, and since the winding 18 is in opposition to the winding 14, this voltage developed in the winding 18 subtracts from the line voltage.

The above described action provides either a "buck" or a "boost" regulating voltage in series with an alternating current line. Since the regulator is connected in series with the line, it only has to handle the power difference to be supplied at the output line.

By way of example, a 10 kva. regulator with a gain of 10 (i.e. to regulate a ±5% input and provide a ±0.5% output) has to handle only 1/10 of the total power. This makes it possible to reduce the size and weight of the regulator considerably compared to an equivalent "constant-voltage transformer" type of regulator.

Since the buck-boost regulator never adds or subtracts more than the deviation from the maximum line input, for example, a 5% deviation, the regulator cannot add more than 5% harmonic distortion thereto. In fact, maximum distortion occurs at one-half the maximum deviation, where the buck or boost is only 2.5% (excluding normal losses in the magnetic core 10), so that it must add less than 2.5% total harmonic distortion. By making the number of turns in the winding 14 slightly greater than the number of turns in the winding 18, the normal losses in the magnetic core 10 can be compensated for automatically; although, with reasonably good regulation, this should not be necessary.

It may be noted also that there is no dependence on a resonating element, and the circuit is inherently independent of frequency. It is necessary only that the core 10 be large enough to handle the maximum input in voltage at the lowest input frequency, as in any transformer design.

The preamplifier 27 is any of a number of types that have been developed for phase control firing of silicon controlled rectifiers. It is only necessary that any rise or fall in the output line voltage be measured by the control preamplifier 27 and amplified to provide an error signal, for example, in the form of a variable phase pulse, to fire with the gate 25 or 26, depending upon whether the output is high or low.

The phase or firing angle at which the silicon controlled rectifier 25, 26 is triggered determines the duration of current flow through it for that half-cycle. This, in turn, controls the amount of increase or decrease of the output line voltage as required to compensate for the drop or rise that is being corrected.

When a silicon controlled rectifier is fired, it will act as a dead short on its associated control winding for the remainder of the (anode positive) half-cycle. As long as the associated winding is shorted, the magnetic flux that was developed in that core leg now is switched to the other outer core leg, as described previously. It will be apparent to those skilled in the art that the particular gating circuit shown in FIG. 1 shorts out the control windings only on alternate half cycles of the A.C. output signal, but that the circuit could be easily adapted to operate on every half cycle by coupling another silicon controlled rectifier in parallel with each of the silicon controlled rectifiers 25 and 26. The control terminal of these added silicon controlled rectifiers would be connected to the control terminal of the corresponding existing silicon controlled rectifier 25 or 26, but the added silicon controlled rectifiers would be connected to conduct in opposition to the existing rectifiers 25 and 26, so that their corresponding windings could be shorted on negative half cycles of the output voltage as well as on positive output cycles thereof.

When ordinary transformer steel is used for the magnetic core 10 and operation is well below saturation, the unbalanced magnetic flux during the time one of the silicon controlled rectifiers is fired, stores energy in the magnetic core 10, and this energy is returned exponentially to the output during the next half cycle. If regulator output is calculated during fabrication to put the magnetic core close to saturation during operation, then "shorting" the magnetic flux in one core leg on alternate half cycles tends to saturate that core leg in the direction of the other half-cycles. As a result, voltage output during the unchanged half-cycles is derived partially from the return of stored energy and partially from core saturation.

On the other hand, by making the magnetic core 10 of grain oriented steel, the voltage output due to core saturation can be increased with respect to the stored energy output, so that the output due to core saturation is predominant.

The difference between the various modes of operation appears in the output as a difference in wave form. However, the output which is supplied by the regulator is only a small percentage, say 5% of the total voltage output. Therefore, any distortion in the regulator output contributes very little harmonic distortion to the total output of the alternating current line.

If it is assumed that the conductor 23 is connected to the line 20, instead of to the conductor 17, the line voltage is also regulated, as described above, provided that the impedance of a load, which is connected to the output terminals, is large in comparison with the inductive reactance of the control windings 14–18. However, if the load draws a heavy current, so that the load impedance is small compared to the inductive reactance of the windings, voltage cannot be developed across the load until one of the silicon controlled rectifiers 25–26 is fired.

By connecting the primary winding 21 between the conductor 24 and the conductor 17, that is, between the two control windings 14–18, this problem is alleviated. The primary winding 21 shorts out the inductance of the control windings when current is drawn by a load, and only the resistance of the windings and the transformer losses appear as impedance between the source and load.

Figure 2A:
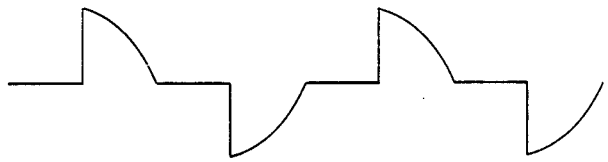
FIG. 2A is a wave form of a voltage provided by the regulator shown in FIG. 1.
Figure 2B:
FIG. 2B is an idealized wave form of the line voltage as modified by the regulator of FIG. 1.

The curve shown in FIG. 2A of the drawings is an idealized representation of the particular case where a control winding of the regulator is shorted equally during each half-cycle. This voltage, then, is added in phase or out of phase to the alternating current line voltage, so that the final output voltage of the line appears as seen in FIG. 2B where a relatively small voltage is either added to or subtracted from the main line voltage. The illustration in FIG. 2B is exaggerated since if drawn to scale, the added voltage would be barely visible since it represents only between 2.5 and 5% of the total line voltage.

As will be understood, there is no distortion in the voltage output when neither of the control windings 14, 18 is shorted since there is no added corrective voltage. However, assume that one side of the regulator is fully shorted, there is no distortion in the voltage output wave since the curve voltage wave form is a full sinusoid. Maximum distortion occurs at a point half way between the above discussed two extremes where the silicon controlled rectifier firing angle is 90° in each half-cycle, which is approximately the wave form illustrated in FIG. 1A.

It will be understood by those skilled in the art that the bucking or boosting voltage could be generated in a pair of separate output windings, not shown, which are magnetically coupled to a corresponding magnetic loop and which are connected in series opposing as described above for the two control windings. In this case the two control windings would, of course, be independent of each other instead of being connected together as shown. It will also be understood that the two output windings (or control windings) could be connected in series aiding if one winding has twice as many turns as the other. In this case unequal voltages would be developed across the two windings and a constant normal boosting voltage would be present at output terminal 20. This normal boosting voltage could be increased by shorting the winding with the smaller number of turns, as will be apparent to those skilled in the art, and it could be decreased by shorting the winding with the larger number of turns. Thus instead of adding a bucking or a boosting voltage this arrangement would either increase or decrease a normal boosting voltage in response to line voltage variations.

Referring to FIG. 3, the equivalent circuit of a portion of an alternative embodiment of the line regulator of the invention, includes first and second cores 33–34, each of which has two legs. A first control winding 35 and a first primary winding 36 are magnetically coupled to the respective legs of the core 33. Similarly, a second control winding 37 and a second primary winding 38 are magnetically coupled to the respective legs of the core. The cores 33–34 are electrically coupled by connecting the primary windings 36 and 38 in series.

The control windings 35 and 37 are connected to the input and output line conductors 16 and 20, respectively. The windings 35 and 37 are also series connected by the conductor 17, and the primary windings 36 and 38 are connected between the conductors 17 and 24.

According to this configuration, the magnetic flux loop generated by each core 33–34 of the regulator is rendered independent of the other. Thus, the control windings in adding or subtracting to the line voltage operate independently of each other.

A third embodiment of the invention provides for the regulation of the line voltage in a step-up or step-down transformer. As shown in FIG. 4, a primary winding 39 and control windings 40–41 would be magnetically coupled to a three leg core as shown in FIG. 1. The gating elements 25–26 are connected in parallel with the windings 40–41, respectively. The windings 40–41, in turn, are series connected by the conductor 17 from variable taps, and one end of the primary winding 39 is connected to the control winding connecting conductor 17. The input line conductor 24a is connected to a variable tap on the primary winding 39, and the opposite end of this winding is connected to the output line conductor 24.

In this configuration the line voltage can be stepped up or stepped down, and, likewise, the voltage across the gates 25–26 can be stepped up or stepped down, while the output line voltage is regulated.

Obviously, many modifications and variations of the present invention are possible in the light of the above teachings. It is to be understood, therefore, that within the scope of the appended claims the invention may be practiced otherwise than as specifically described.

I claim:

1. An alternating current line regulator comprising: a pair of input terminals for an A.C. source to be regulated and a pair of output terminals; primary flux generating means coupled in parallel between said input and output terminals; first and second control windings connected in series between said input and output terminals; gating means, each having at least three electrodes, one of said electrodes serving to control the current passage between the remaining two electrodes, connected in parallel with each of said control windings for shorting a selective one thereof; core means for magnetically coupling each of said control windings to said primary flux generating means; and means, coupled in parallel between said input and output terminals and coupled to said gating means control electrode, for detecting variations in A.C. voltage and selectively closing said gating means to compensate therefor.

2. The regulator claimed in claim 1 in which the control windings are of substantially the same number of turns and are connected in series opposition with respect to the magnetic coupling of said primary flux generating means.

3. The regulator claimed in claim 1 in which each said gate means comprises at least one silicon controlled rectifier.

4. An alternating current line regulator comprising a pair of input terminals for an A.C. source to be regulated and a pair of output terminals; a three legged magnetic core; a primary winding coupled in parallel between said input and output terminals and disposed on one leg of said core; first and second control windings connected in series between said input and output terminals and disposed respectively on the remaining two legs of said core; gating means, each having at least three electrodes one of said electrodes serving to control the current passage between the remaining two electrodes, connected in parallel with each of said control windings for shorting a selective one thereof; and means coupled in parallel between said input and output terminals and coupled to said gating means control electrode, for detecting variations in A.C. voltage and selectively closing said gating means to compensate therefor.

5. The regulator claimed in claim 4 in which each said gating means comprises at least one silicon controlled rectifier.

6. The regulator claimed in claim 4 in which said control windings have an unequal number of turns and are connected in series aiding with respect to the magnetic coupling of said primary winding.

7. The regulator claimed in claim 4 in which said control windings are of substantially the same number of turns and are connected in series opposition with respect to the magnetic coupling of said primary winding.

8. The regulator claimed in claim 7 in which the primary winding is disposed on the central of the three core legs.

9. The regulator claimed in claim 7 in which the primary winding is connected between one input terminal and the juncture of said first and second control windings.

10. An alternating current line regulator comprising: a pair of input terminals for an A.C. source to be regulated and a pair of output terminals, primary flux generating means including a winding having a variable tap thereon, one terminal of the winding and the tap being coupled between the said input terminals and the whole winding being coupled between said output terminals; first and second control windings each including a variable tap thereon, said control windings being connected in series by said variable tape between said input and output terminals; gate means connected in parallel with each of said control windings for shorting a selective one thereof; core means for magnetically coupling each said control windings to said primary flux generating means; and means, coupled in parallel between said input and output terminals and coupled to said gating means, for detecting variations in A.C. voltage and selectively closing said gating means to compensate therefor.

11. An alternating current line regulator comprising a pair of input terminals for an A.C. source to be regulated and a pair of output terminals; a three legged magnetic core; a primary winding in an autotransformer configuration coupled in parallel between said input and output terminals and disposed on one leg of said core; first and second control windings, disposed respectively on the remaining two legs of said core, each including a variable tap thereon, said control windings being connected in series by said variable taps between said input and output terminals; gate means connected in parallel with each of said control windings for shorting a selective one thereof; and means coupled in parallel between said input and output terminals and coupled to said gating means, for detecting variations in A.C. voltage and selectively closing said gating means to compensate therefor.

12. The regulator of claim 1, wherein said core means comprises first and second magnetizable cores, and said primary flux generating means comprises first and second primary windings series connected to each other, the series primary windings being connected to the juncture at said first and second control windings and one input terminal, one of said primary windings and one of said control windings being magnetically coupled to said first core to form a first magnetic circuit and the second of said primary windings and the second of said control windings being magnetically coupled to said second core to form a second magnetic circuit, so that said first and second magnetic circuits are independent of each other.

13. An alternating current line regulator as set forth in claim 4, wherein said detecting means includes a control preamplifier connected between said output terminals to provide an output signal in response to a variation in the output voltage.

References Cited by the Examiner
UNITED STATES PATENTS

| | | | |
|---|---|---|---|
| 1,902,466 | 3/33 | Ratkovszky | 323—45 |
| 2,039,044 | 4/36 | Wolfert et al. | 323—45 |
| 3,103,619 | 9/63 | Du Vall | 323—50 X |
| 3,128,440 | 4/64 | Davis. | |

LLOYD McCOLLUM, *Primary Examiner.*